US008654517B2

(12) United States Patent
Aumiller et al.

(10) Patent No.: US 8,654,517 B2
(45) Date of Patent: Feb. 18, 2014

(54) STRUCTURAL CHASSIS FOR A DISPLAY DEVICE

(75) Inventors: Curt Aumiller, Redmond, WA (US); Bernie Schultz, Bothel, WA (US); Rajesh Dighde, Redmond, WA (US); John Stephen Campbell, Puyallup, WA (US); Franklin Willard Bradshaw, II, Mukilteo, WA (US)

(73) Assignee: Microsoft Corporation, Redmond, WA (US)

(*) Notice: Subject to any disclaimer, the term of this patent is extended or adjusted under 35 U.S.C. 154(b) by 372 days.

(21) Appl. No.: 13/084,359

(22) Filed: Apr. 11, 2011

(65) Prior Publication Data

US 2012/0170179 A1  Jul. 5, 2012

Related U.S. Application Data

(60) Provisional application No. 61/429,706, filed on Jan. 4, 2011.

(51) Int. Cl.
*G06F 1/16* (2006.01)
(52) U.S. Cl.
USPC ............ 361/679.02; 361/679.21; 361/679.22; 361/679.23; 108/50.01; 108/50.02
(58) Field of Classification Search
USPC ...................................................... 312/223.3
See application file for complete search history.

(56) References Cited

U.S. PATENT DOCUMENTS

| 3,940,136 | A | * | 2/1976 | Runte | 463/3 |
| D250,336 | S | * | 11/1978 | Esslinger et al. | D13/163 |
| 5,456,468 | A | * | 10/1995 | Stringfellow et al. | 463/46 |
| 5,699,744 | A | * | 12/1997 | Lechman | 108/109 |
| 5,758,935 | A | * | 6/1998 | Coonan | 312/223.3 |
| D406,777 | S | * | 3/1999 | Eggink | D10/46 |
| 5,913,582 | A | * | 6/1999 | Coonan | 312/223.3 |
| 6,047,648 | A | * | 4/2000 | Alm et al. | 108/157.16 |
| 6,059,385 | A | * | 5/2000 | Guhl | 312/223.2 |
| 6,170,926 | B1 | * | 1/2001 | Roberts et al. | 312/194 |
| 6,286,440 | B1 | * | 9/2001 | Jyringi | 108/50.01 |
| 6,791,575 | B2 | * | 9/2004 | Abboud | 345/649 |
| 7,133,281 | B2 | | 11/2006 | Bae | |
| 7,428,989 | B2 | * | 9/2008 | Abboud et al. | 235/383 |
| 7,439,694 | B2 | * | 10/2008 | Atlas et al. | 318/280 |
| 7,447,034 | B2 | | 11/2008 | Shin | |

(Continued)

OTHER PUBLICATIONS

"Innovative office products 7000 LCD arm—Flexible monitor mount", Retrieved at << http://www.pcmall.com/p/Innovative-Office-Products-Monitor-And-Projector-Accessories/product-dpno-604602-pdp.dbcfijd >>, Jan. 5, 2011, pp. 2.

(Continued)

*Primary Examiner* — Anthony Q Edwards
(74) *Attorney, Agent, or Firm* — Jeremy Snodgrass; Glen Johnson; Micky Minhas

(57) ABSTRACT

Various embodiments are described relating to mounting chassis for the assembly and support of display devices. For example, one disclosed embodiment provides a mounting chassis for an interactive display device. The mounting chassis includes a plurality of sides defining an opening, wherein the plurality of sides including a lip extending into the opening, the lip being configured to support an electronic display panel. The chassis also includes one or more display panel fastening features disposed on the plurality of sides, and one or more integrated stand mounts integrated into one or more of the sides.

20 Claims, 9 Drawing Sheets

(56) References Cited

U.S. PATENT DOCUMENTS

| | | | |
|---|---|---|---|
| 7,453,685 B2* | 11/2008 | Lube | 361/679.27 |
| 7,505,258 B2 | 3/2009 | Kim et al. | |
| 7,508,655 B2* | 3/2009 | Baek | 349/56 |
| 7,621,415 B2* | 11/2009 | Han et al. | 220/9.4 |
| 7,719,832 B2 | 5/2010 | Kobara et al. | |
| 7,847,876 B2 | 12/2010 | Harayama | |
| 2001/0043290 A1* | 11/2001 | Yamamoto | 348/836 |
| 2002/0097567 A1* | 7/2002 | Zodnik et al. | 361/820 |
| 2004/0018870 A1* | 1/2004 | Cole | 463/20 |
| 2005/0049049 A1* | 3/2005 | Griswold et al. | 463/46 |
| 2006/0267952 A1* | 11/2006 | Alcorn | 345/173 |
| 2006/0274046 A1* | 12/2006 | Hillis et al. | 345/173 |
| 2008/0127809 A1* | 6/2008 | Fu | 84/477 R |
| 2009/0325686 A1* | 12/2009 | Davis et al. | 463/25 |
| 2010/0118215 A1 | 5/2010 | Bussiere et al. | |
| 2012/0105332 A1* | 5/2012 | Aumiller et al. | 345/173 |

OTHER PUBLICATIONS

Norley, et al., "A new chassis design concept for plasma display panels", Retrieved at << http://citeseerx.ist.psu.edu/viewdoc/download?doi=10.1.1.137.4224&rep=rep1&type=pdf >>, vol. 37, Issue 1, Jun. 2006, pp. 462-465.

* cited by examiner

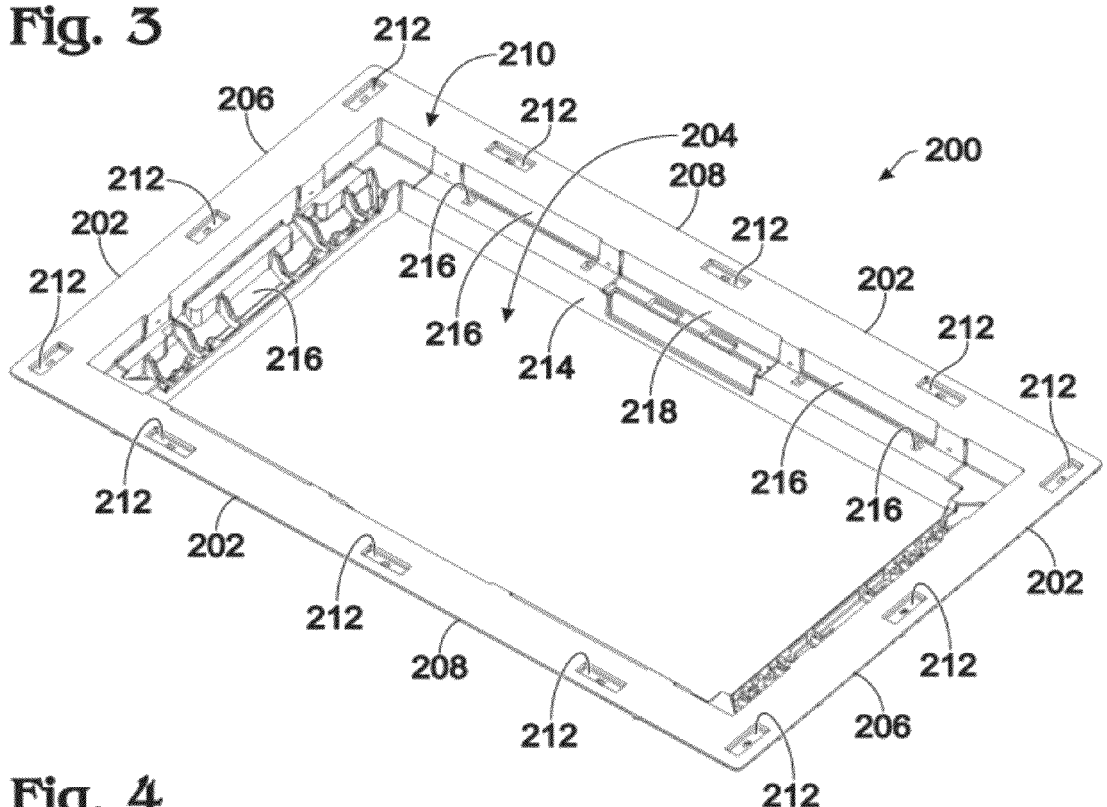
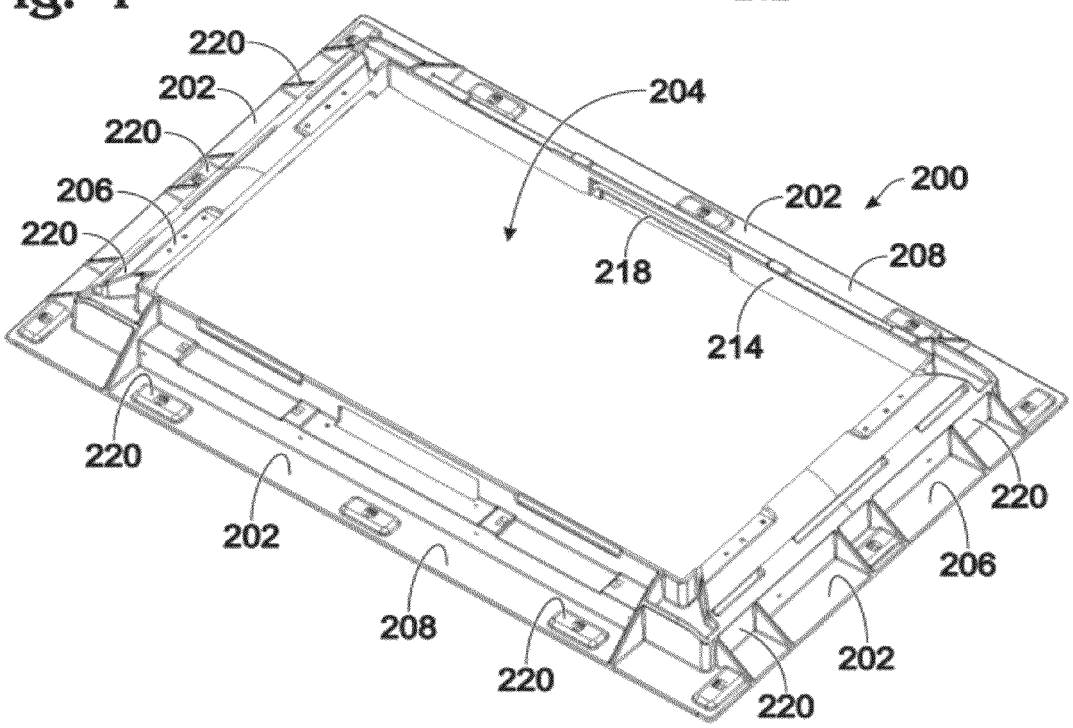

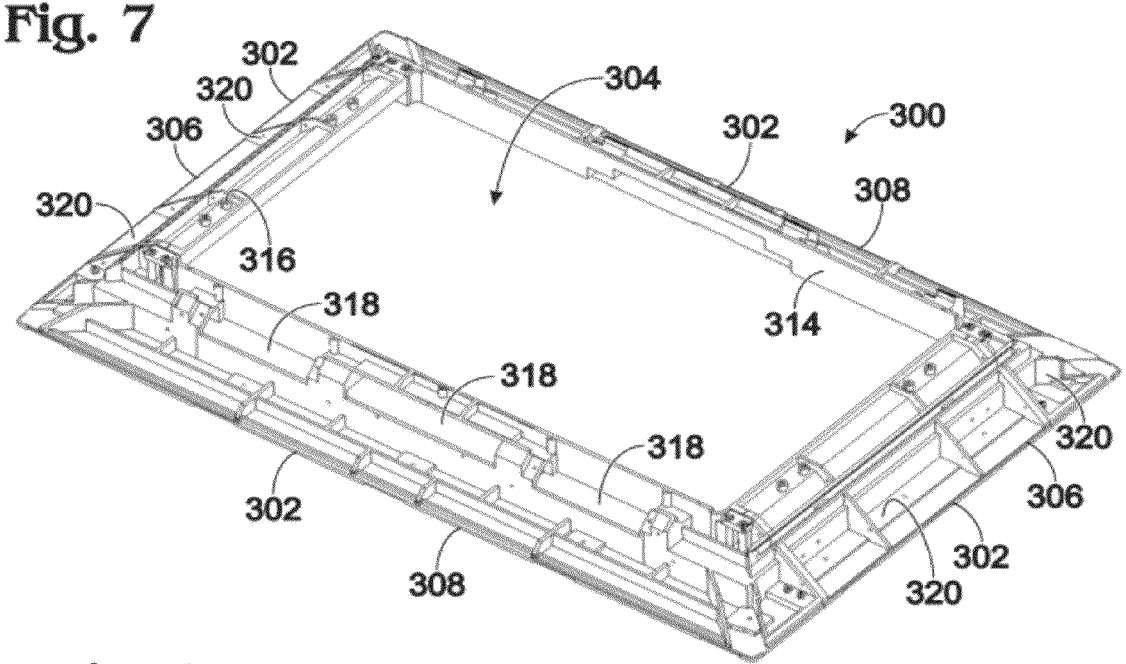
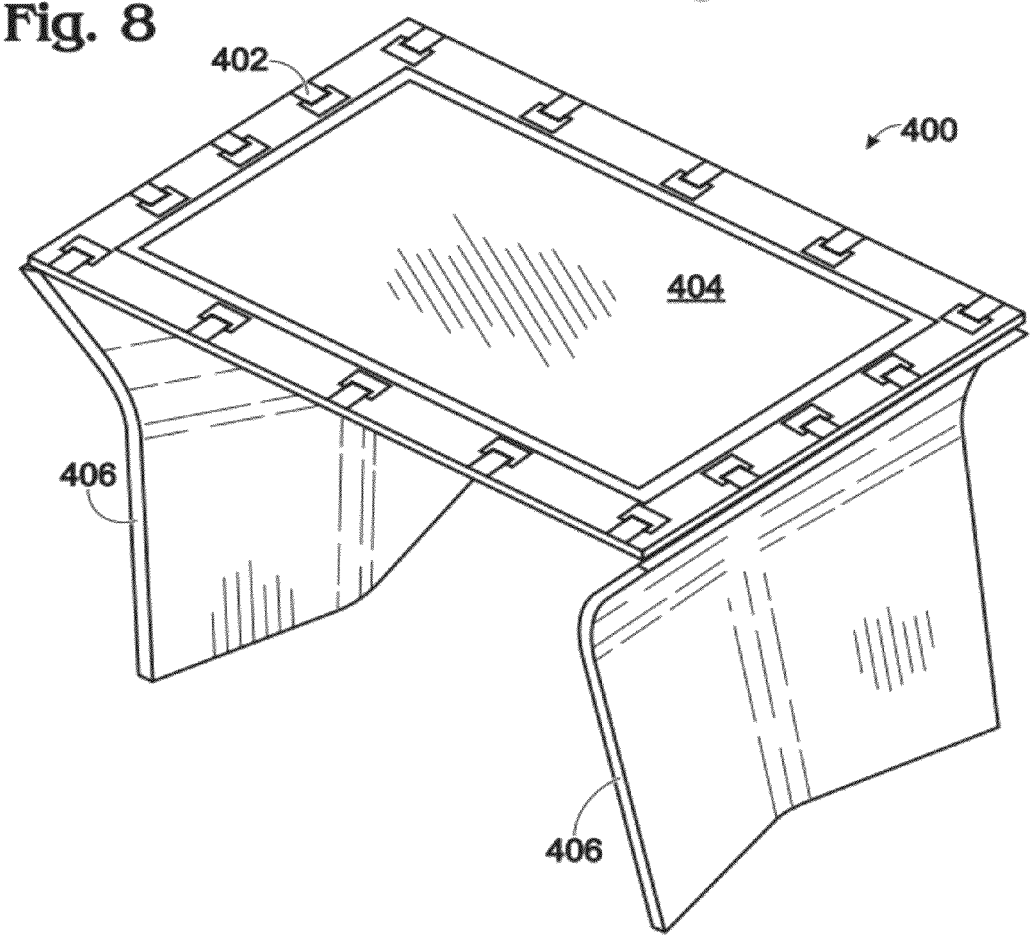

STRUCTURAL CHASSIS FOR A DISPLAY DEVICE

CROSS-REFERENCE TO RELATED APPLICATIONS

This application claims priority to U.S. Provisional Patent Application No. 61/429,706, filed Jan. 4, 2011 and titled STRUCTURAL CHASSIS FOR A DISPLAY DEVICE, the entirety of which is hereby incorporated by reference.

BACKGROUND

Multi-touch interactive display devices, such as surface computing devices, may contain various structurally sensitive components, including sensors, electronics, and display panels including but not limited to liquid crystal displays (LCD), OLED and/or plasma display panels (PDP). These panels may be damaged or otherwise affected by impact loads during manufacturing, shipping and usage in public venues, e.g. bars and restaurants. Further, some LCD technologies, e.g., in plane switching and plane line switching, may be sensitive to uneven pressure or stress which may cause distortion of liquid crystals resulting in display artifacts, such as banding.

Traditional display mounting methods and structures are often configured to mount such displays in a vertical orientation with reference to a plane of the display screen. However, such displays also may be used as horizontally oriented multi-touch interactive displays, inclined kiosk displays, etc. As such, these displays and components may be subject to stresses from foreseen and unforeseen static and dynamic loads, for example, resulting from users leaning on the units, objects bumping into the units, etc. These stresses may damage or otherwise affect performance of a display and sensor panel intended for vertical orientation.

SUMMARY

Various embodiments are described herein that relate to mounting chassis for the assembly and support of display devices. For example, one disclosed embodiment provides a mounting chassis for an interactive display device, the mounting chassis comprising a plurality of sides defining an opening. The plurality of sides includes a lip extending into the opening, the lip being configured to support an electronic display panel. The chassis also includes one or more display panel fastening features disposed on the plurality of sides and one or more integrated stand mounts integrated into one or more of the sides.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a top view of a second example embodiment of a mounting chassis for an interactive display device.

FIG. 4 shows a bottom view of the embodiment of FIG. 3.

FIG. 7 shows a bottom view of the embodiment of FIG. 6.

FIG. 8 shows an example embodiment of an interactive display device comprising a mounting chassis and a stand structure coupled to the mounting chassis.

DETAILED DESCRIPTION

The disclosed embodiments provide an internal structural chassis that may be used to provide easily manufactured, highly reliable devices to an end customer. The disclosed embodiments may address impact protection, universal mounting options for VESA, legs or other mounting implementations, easy manufacturing integration, flexible selection and interchangeability of accessories, support of heavier reinforced display panels, and safety. Further, disclosed embodiments may be configured to provide integrated passive thermal heat-sinking for enclosed electrical components of an interactive display device. Additionally, various integrated features and standardization of mounting configurations may enable third-party suppliers to offer flexible and interchangeable accessories and mounting solutions to the customer.

The embodiments disclosed herein may meet various safety requirements, e.g., IEC 60950-1 safety requirements, and may reduce display panel stress levels due to impact loads, construction processes, and general use. For example, external stresses due to impacts, such as a person hitting the device or the device being dropped during manufacturing, and stresses due to ordinary manufacturing processes, such as fastening the device together, may be absorbed by the chassis rather than the display panel. The internal chassis may also reduce the stresses on the top of the display by controlling the flatness of the top surface where a bezel or top border is to be mounted. Often, this surface is not highly accurate and may put undue stress on the edge of the display panel. The disclosed embodiments thus may reduce the stresses imparted by the traditional bezel mounting to displays.

Further, in traditional display panel manufacturing, the display electrical components may be mounted directly to the display. In contrast, in the disclosed embodiments, the display chassis may be at least partially decoupled from its dependency on some of these electrical components by including a separate electric plane for mounting various electronic components.

Additionally, the disclosed embodiments are modular to provide easy manufacturing integration, and may include various flexible mounting options such as fastenerless quick mount features. This may enable third-party suppliers to offer suitable mounting solutions to the customer and allow a display panel to be integrated into the design. Further, integrated VESA mounting features on the chassis may help to reduce the structural dependency on VESA mounts incorporated into the display panel enclosure, which may be thin and relatively weak.

Additionally, unlike traditional display enclosures, the internal chassis disclosed herein may provide intrinsic heat sinking capabilities, as a thermal path may be provided from electrical components to the chassis, thus providing thermal management.

Figure 1:
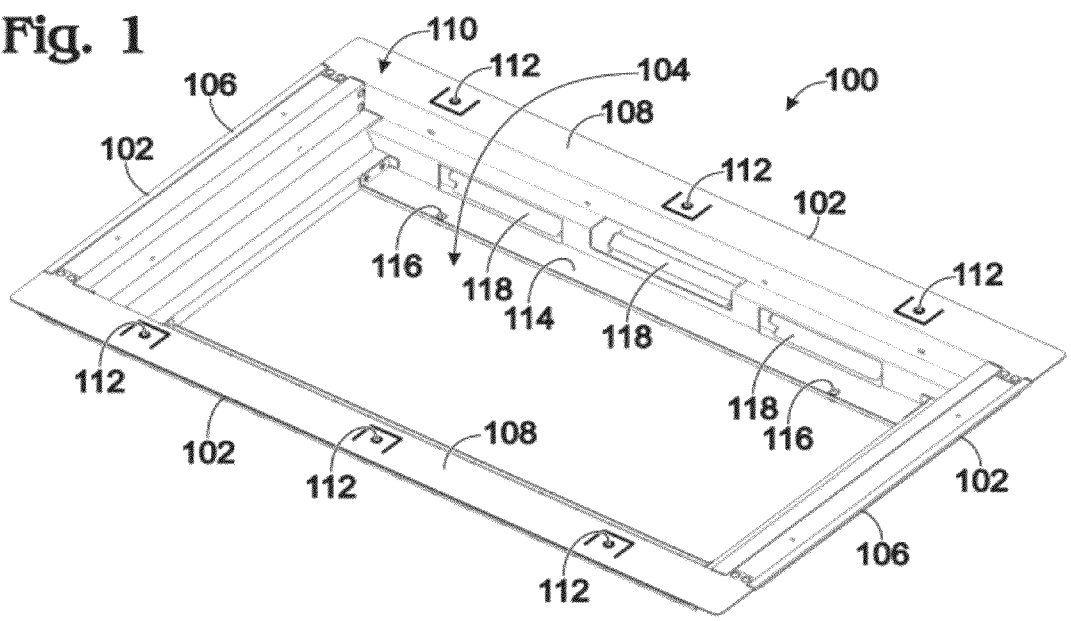
FIG. 1 shows a top view of a first example embodiment of a mounting chassis for an interactive display device.
Figure 2:
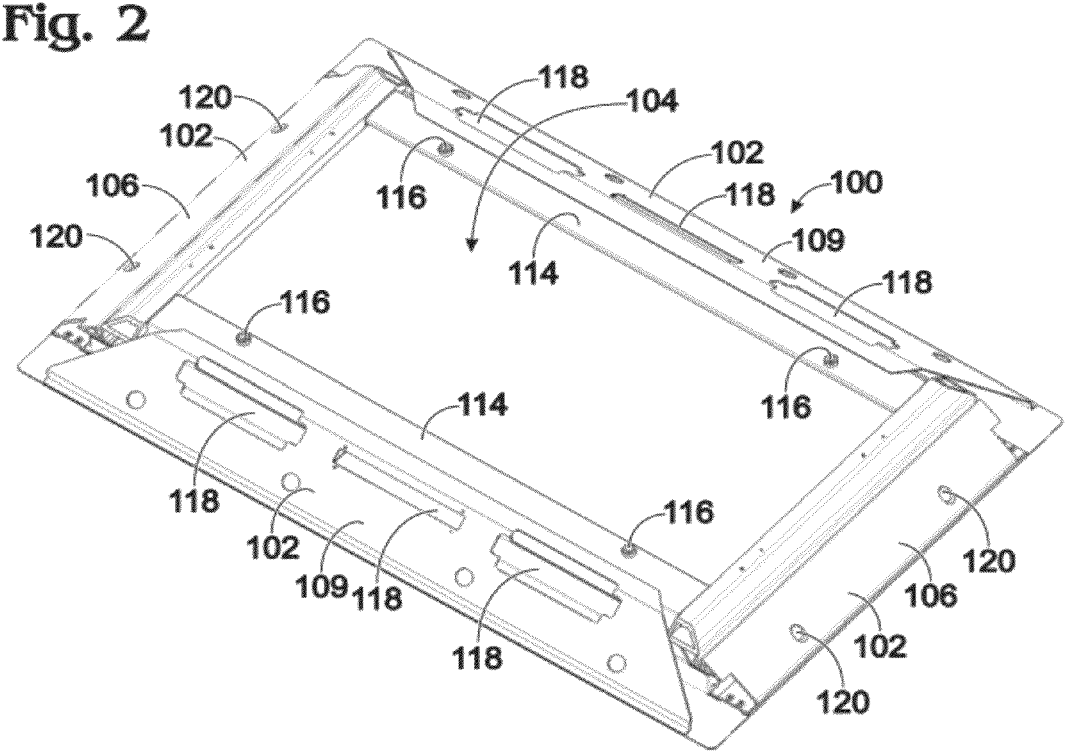
FIG. 2 shows a bottom view of the embodiment of FIG. 1.

FIG. 1 shows a top view of a first example embodiment of a mounting chassis 100 for an interactive display device, and FIG. 2 shows a bottom view of chassis 100. Chassis 100 includes a plurality of sides 102 defining an opening 104 sized to receive and hold an electronic display panel, e.g., an LCD or PDP. The plurality of sides may be formed from any suitable material or materials. Examples of suitable materials which may form at least a portion of the plurality of sides include, but are not limited to, die cast metal, e.g., aluminum, sheet metal, and extruded or injection molded plastics or polymers or composites. In the depicted embodiment, chassis 100 is formed from six total pieces of three different constructions—a short side piece 106, a top long-side piece 108, and a bottom long-side piece 109. Each of the depicted pieces may be shaped from sheet metal, allowing for economical construction. It will be understood that material and construction choices may depend on cost, weight, intended use environment, and desired performance features.

As shown in FIGS. 1 and 2, the plurality of sides may comprise short sides and long sides. In the depicted embodiment, two opposing short sides are interconnected with two opposing long sides. The size or skew of the sides may be customized based on a particular application of the device. It will be appreciated that a chassis may have any other suitable shape and/or configuration of sides, depending upon the shape of a display panel to be mounted in the chassis as well as a desired shape of an end product in which the chassis and display panel are to be incorporated. For example, such a display chassis may be configurable so that the display may be embedded in furniture, countertops, etc.

The depicted chassis 100 further comprises a top surface 110 having one or more top border mounting features 112. The one or more top border mounting features 112 include locating features for mounting and aligning a top border which may be positioned on top surface 110 after an electronic display panel is inserted into opening 104. Though shown in FIGS. 1 and 2 as square indents with holes to accommodate fasteners, the one or more top border mounting features may be of any suitable shape and configuration for aligning and mounting a top border or bezel, and may have integrated fasteners in some embodiments.

Chassis 100 also includes a lip 114 extending inwardly from one or more of the sides. The lip 114 is configured to support an electronic display panel. Chassis 100 also includes one or more display panel fastening features 116 disposed on the plurality of sides 102. For example, the one or more display panel fastening features may include screws, springs, snaps, locking mechanisms or the like to fix an electronic display panel in place. When mounted in chassis 100, a display panel is protected from impacts during manufacturing and use by the chassis 100, as compared to traditional display panel enclosures.

Chassis 100 also includes one or more component mounts 118 integrated into one or more of the sides 102. The component mounts are configured to mount accessory components, such as mount printed circuit board assemblies (PCBA), speakers, WIFI or radio frequency (RF) antennas, blue-tooth antennas, and/or any other devices based on an application of the interactive display device. These component mounts may be standardized in configuration, thus, enabling third-party suppliers to offer a variety of flexible and interchangeable standardized accessories and mounting solutions designed to fit the standardized component mounts. In this way, modular assembly benefits may be provided by the internal chassis described herein. In the embodiment of FIGS. 1 and 2, the component mounts 118 are depicted as being located on the long sides of the chassis, but it will be understood that such mounts also may be included on the short sides of a chassis, or at any other suitable location. In some embodiments, the accessories may be mounted in special material casings, to allow better performance, e.g. plastic casings may be used for Wi-Fi antennae. Further, in some embodiments, a thermal pathway may be provided from components mounted in the component mounts to the chassis, thereby allowing the chassis to function as a heat sink for such components.

Chassis 100 also includes one or more integrated stand mounts 120 integrated into one or more of the sides 102. The depicted integrated stand mounts include slots on the short sides, but it will be understood that stand mounts also may be provided on the long sides. As shown in FIGS. 1 and 2, the shorts side may be thicker than the long sides to provide additional support when legs or other stand components are mounted to the stand mounts. Stand components may be coupled to stand mounts 120 via various interlocking features such as slide mounts, bushings, and/or screws for ease of assembly.

Turning now to FIGS. 3 and 4, FIG. 3 shows a top view of a second example embodiment of a mounting chassis 200 for an interactive display device, and FIG. 4 shows a bottom view of chassis 200. As with chassis 100, chassis 200 includes a plurality of sides 202 defining an opening 204 sized to receive and hold an electronic display panel. Chassis 200 is formed from a single unitary piece, and comprises a pair of opposing long sides 206 and a pair of opposing short sides 208. Chassis 200 may be formed in any suitable manner, including but not limited to die casting and molding techniques, and may be formed from any suitable material or materials, including but not limited to various metals, polymers, and/or composites. Forming chassis 200 from a unitary piece may help to improve manufacturing uniformity and tolerances compared to a chassis 200 formed from multiple pieces fastened together.

Figure 5:
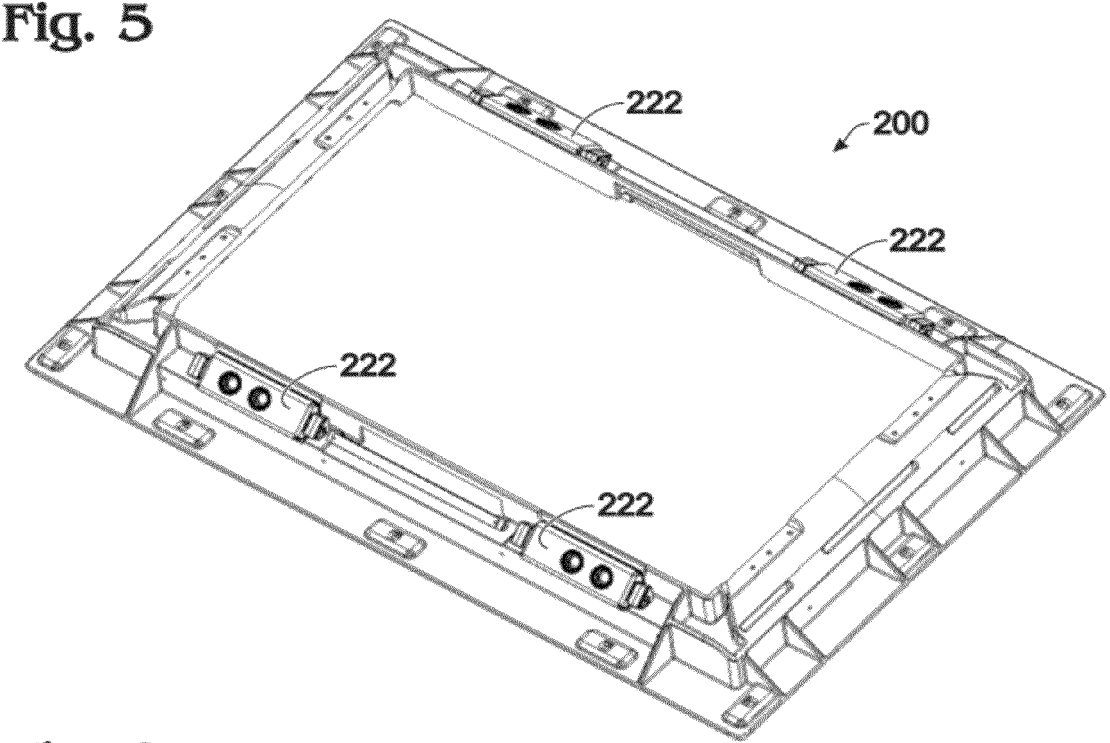
FIG. 5 shows example embodiments of accessory components mounted to component mounts of the embodiment of FIG. 3.

The chassis 200 further comprises a top surface 210 having one or more top border mounting features 212. Though shown in FIGS. 3 and 4 as square indents, the one or more top border mounting features may be of any suitable shape for aligning and mounting a top border or bezel. Chassis 200 likewise includes a lip 214 extending inwardly from one or more of the sides and configured to support an electronic display panel. Further, one or more display panel fastening features 216 are disposed along the plurality of sides 202, and/or on lip 214. Chassis 200 also includes one or more component mounts 218 integrated into one or more of the sides 202 which are configured to mount accessory components, as described above. As one specific embodiment of such components, FIG. 5 shows an example of speakers 222 mounted to component mounts 218.

Chassis 200 also includes one or more integrated stand mounts 220 integrated into one or more of the sides 202. The depicted integrated stand mounts 220 include slots or indentations on the short sides 206, but it will be understood that any other suitable stand mounting features may be included.

Figure 6:
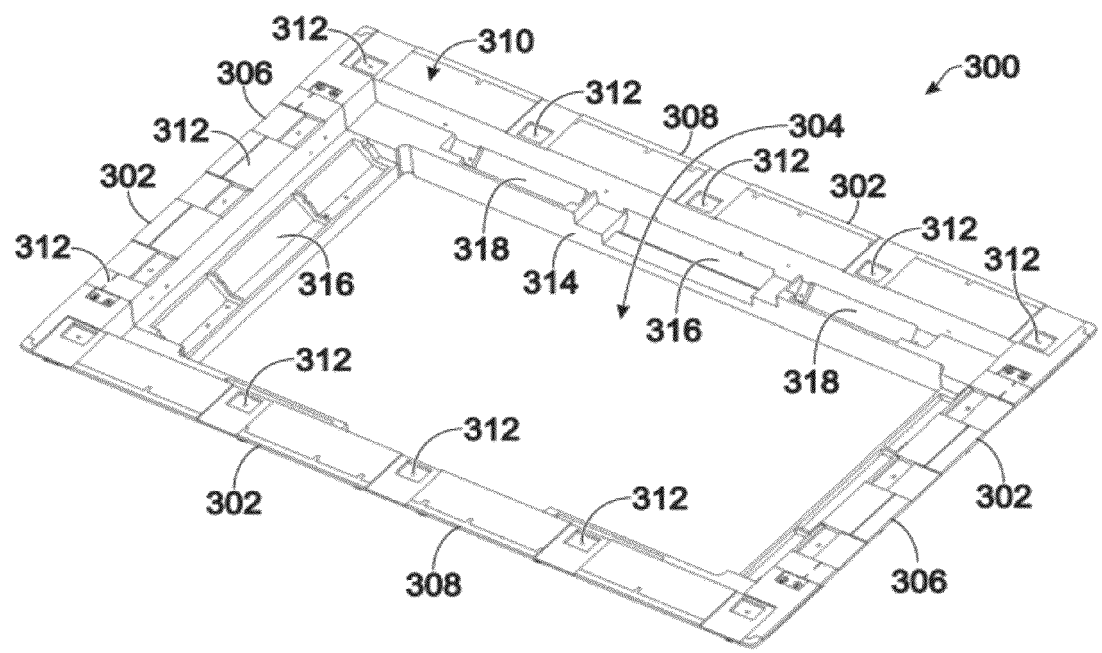
FIG. 6 shows a top view of a third example embodiment of a mounting chassis for an interactive display device.

Next, FIG. 6 shows a top view of a third example embodiment of a mounting chassis 300 for an interactive display device, and FIG. 7 shows a bottom view of chassis 300. Chassis 300 includes a plurality of sides 302 defining an opening 304 sized to receive and hold an electronic display panel. The plurality of sides may be formed from a plurality of pieces connected together by a suitable coupling or couplings, including but not limited to, screws, bolts, welds, adhesives, etc. In the depicted embodiment, the plurality of sides comprise two short sides 306 and two long sides 308. In the depicted embodiment, the two short sides 306 have an identical construction, as do the two long sides 308, which may help to simplify manufacturing, as the chassis 300 may be formed from two extruded shapes cut to desired lengths. In other embodiments, all sides may be formed from a single extruded shape, or from three or more extruded shapes.

The plurality of sides 302 has a top surface 310 comprising one or more top border mounting features 312. Though shown in FIGS. 6 and 7 as square indents, the one or more top border mounting features may be of any suitable shape for aligning and mounting a top border or bezel.

As with chassis 100 and 200, chassis 300 includes a lip 314 extending inwardly from one or more of the sides and configured to support an electronic display panel, and one or more display panel fastening features 316 disposed on the plurality of sides 302 and/or on a top surface of the lip. The display panel fastening features may include any suitable connecting structures, including but not limited to holes for bolts or screws, various snap features, tongue and groove features, springs, etc.

Chassis 300 further includes one or more component mounts 318 integrated into one or more of the sides 302, wherein the component mounts 318 are configured to mount accessory components, as described above. Chassis 300 also includes one or more integrated stand mounts 320 integrated into one or more of the sides 302. The depicted integrated stand mounts include slots or indentations on the short sides 206 configured to receive the attachment of stand structures such as legs via brackets or other connecting structure.

Figure 9:
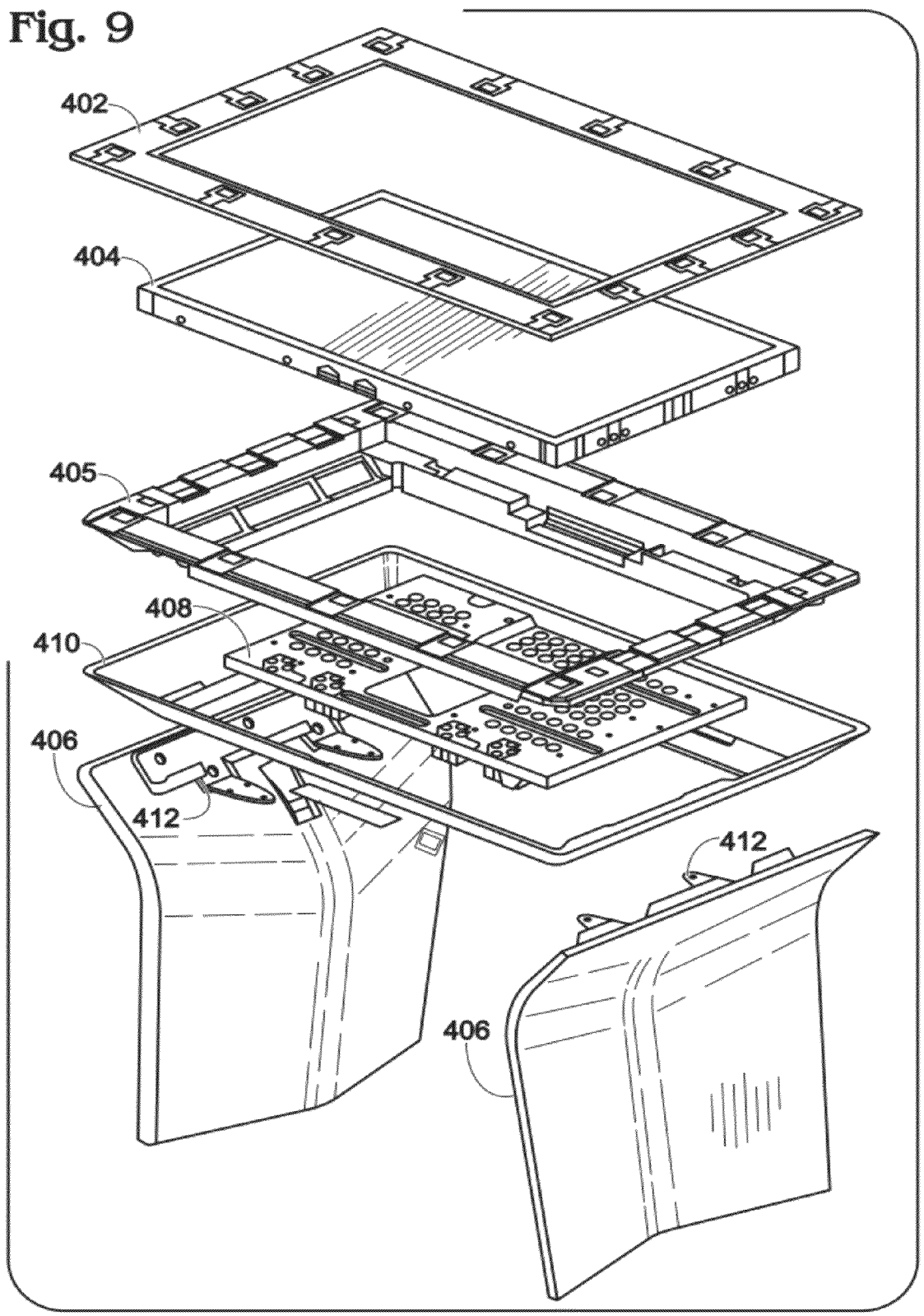
FIG. 9 shows an exploded view of the embodiment of FIG. 8.

Next, FIG. 8 shows an example embodiment of an interactive display device 400, and FIG. 9 shows an exploded view of the interactive display device 400. Interactive display device 400 includes a top border 402 with an aperture sized to expose a viewing surface 404 of an electronic display panel. The display panel is mounted in a chassis 405 as described above, and stand structures in the form of legs 406 are coupled to the chassis to provide support for the interactive display device.

An electronic plane 408 is coupled to the display panel and/or chassis 405, and includes various electronic circuits and components. A skin 410 may be located external to chassis 405. Skin 410 may comprise a thin layer of metal or plastic to provide a desired exterior appearance to the interactive display device 400. Legs 406 are coupled to the chassis via brackets 412 that fit into stand mounting features formed in the chassis, as described above.

Figure 10:
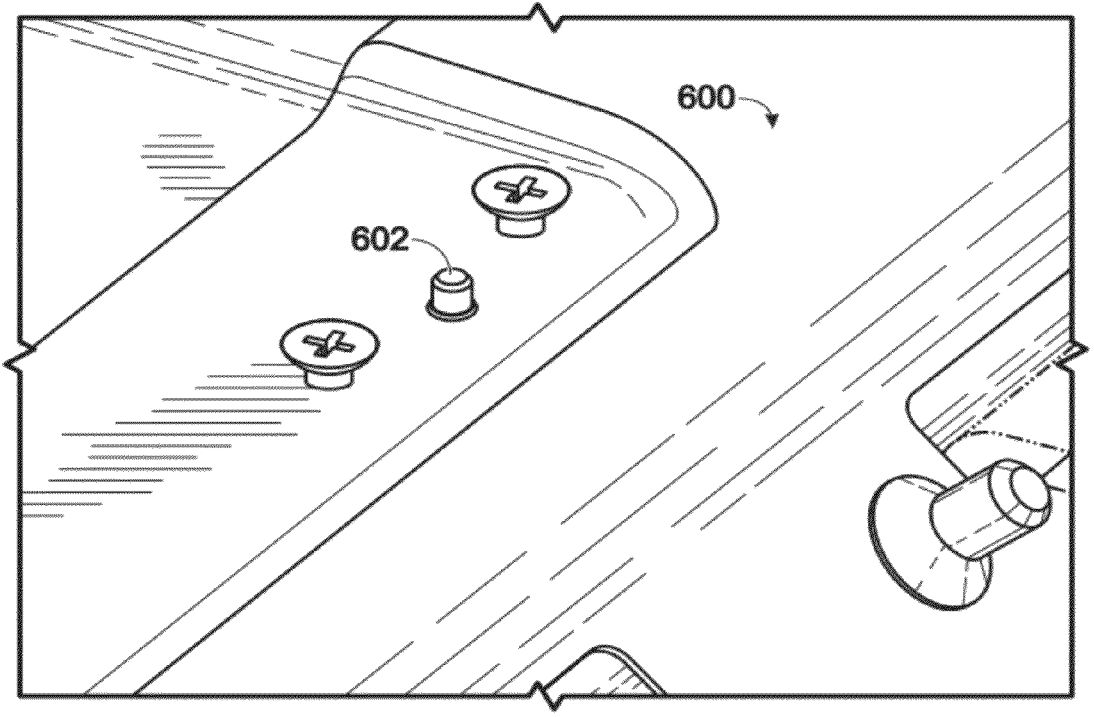
FIGS. 10 and 11 show a detailed view of an embodiment of a pin structure for mounting a stand structure to an interactive display device chassis.
Figure 11:
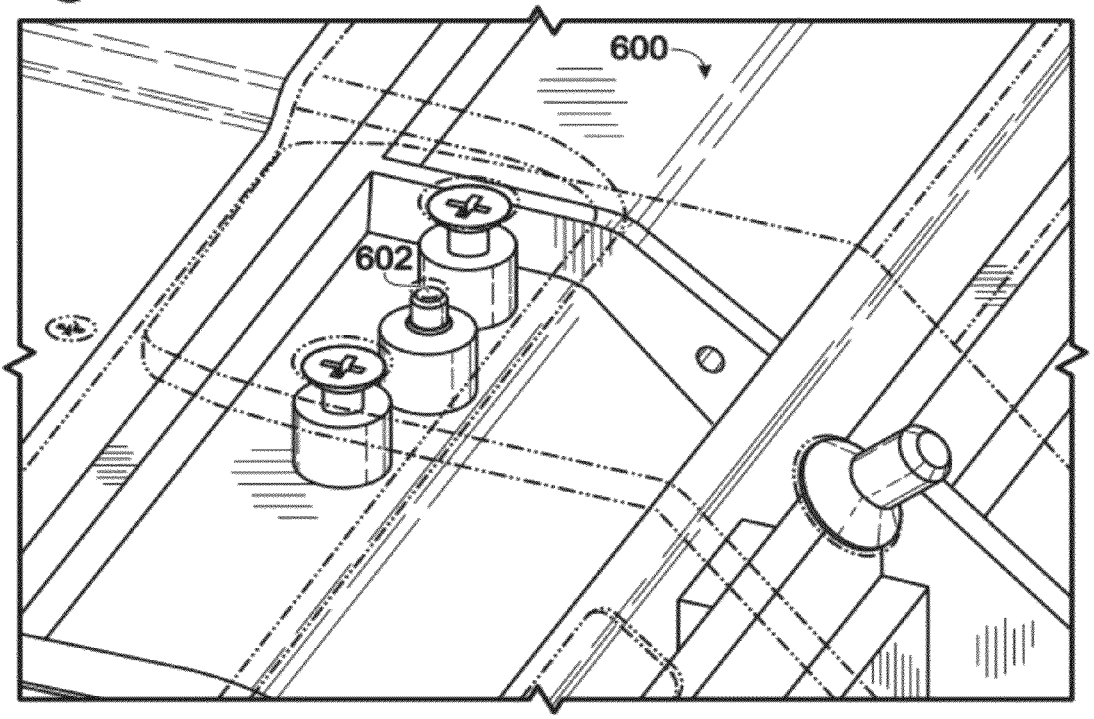
Figure 12:
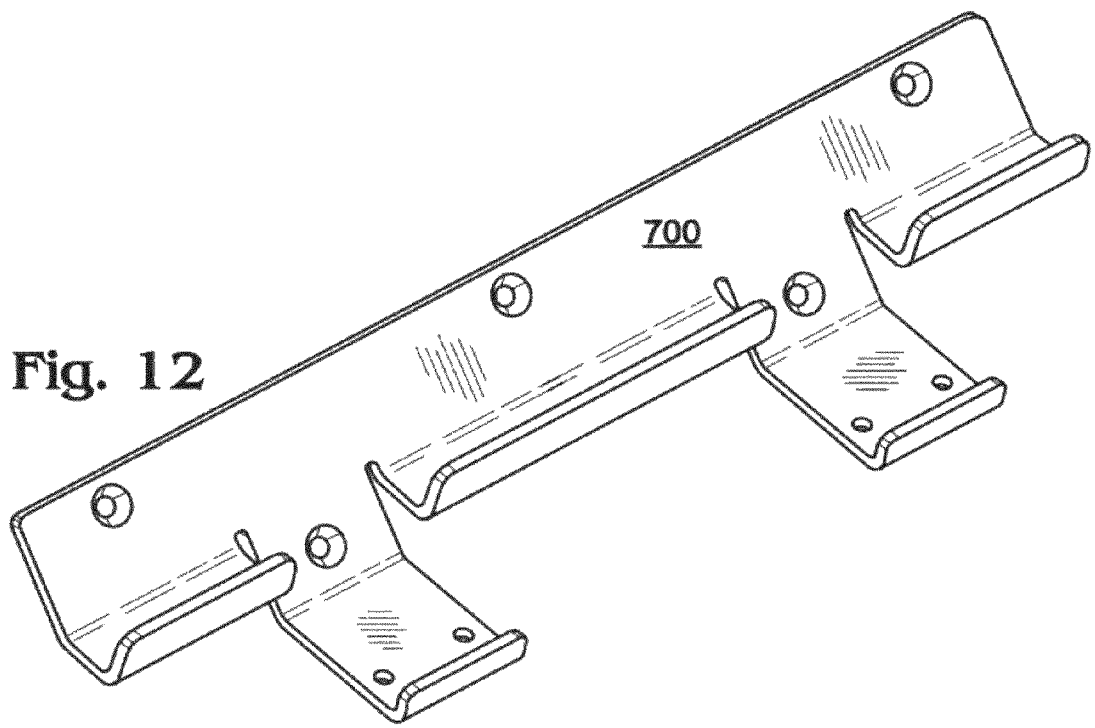
FIGS. 12 and 13 show an example coupling of a stand structure to an interactive display device via a bracket according to an embodiment of the present disclosure.
Figure 13:
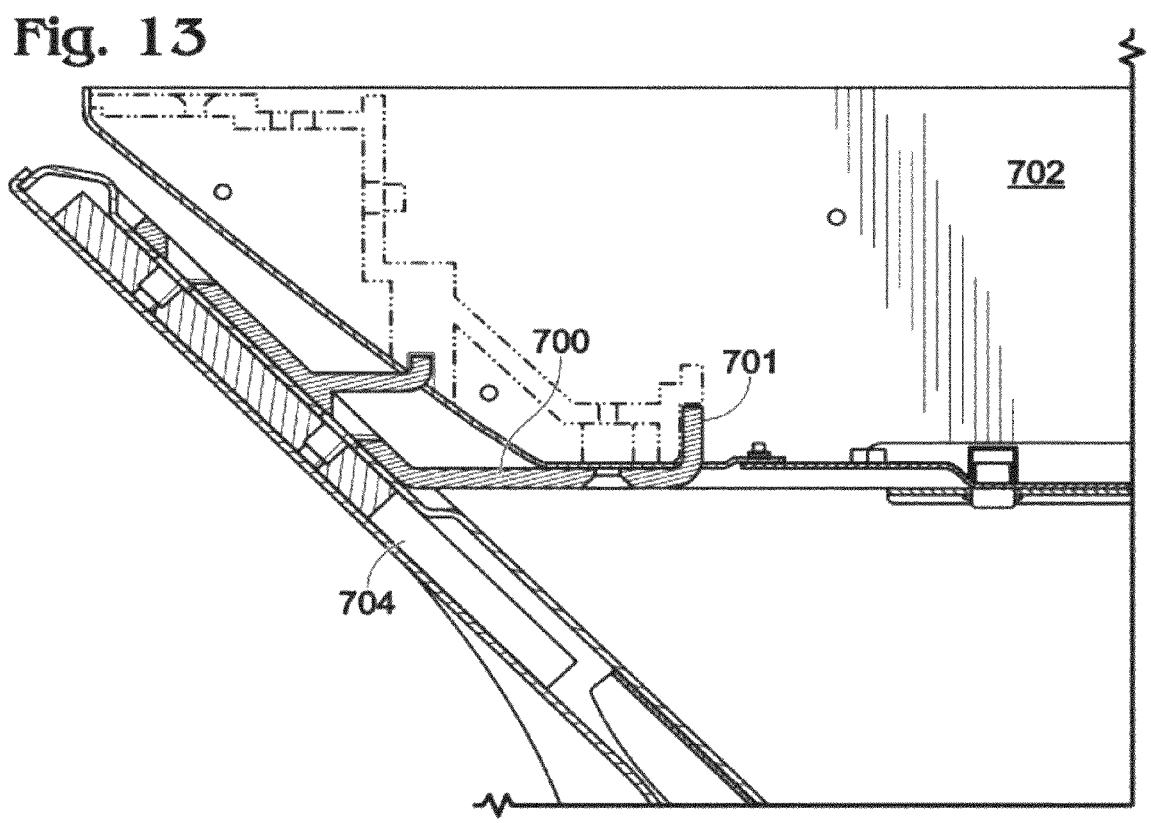

Various structures may be used to increase the stability of a connection between a stand component and an integrated stand mount of the depicted embodiments. For example, FIGS. 10 and 11 show an embodiment of a pin 602 configured to fit within a complementary hole on a corresponding mounting bracket of a leg or other stand structure. FIGS. 12 and 13 show another embodiment of a structure for increasing the stability of a stand component mounted to a chassis, in the form of a stand mounting bracket 700 comprising a curved end 701 that extends into a complementary slot on a chassis 702 to hold a stand 704 securely to the chassis 702.

Figure 14:
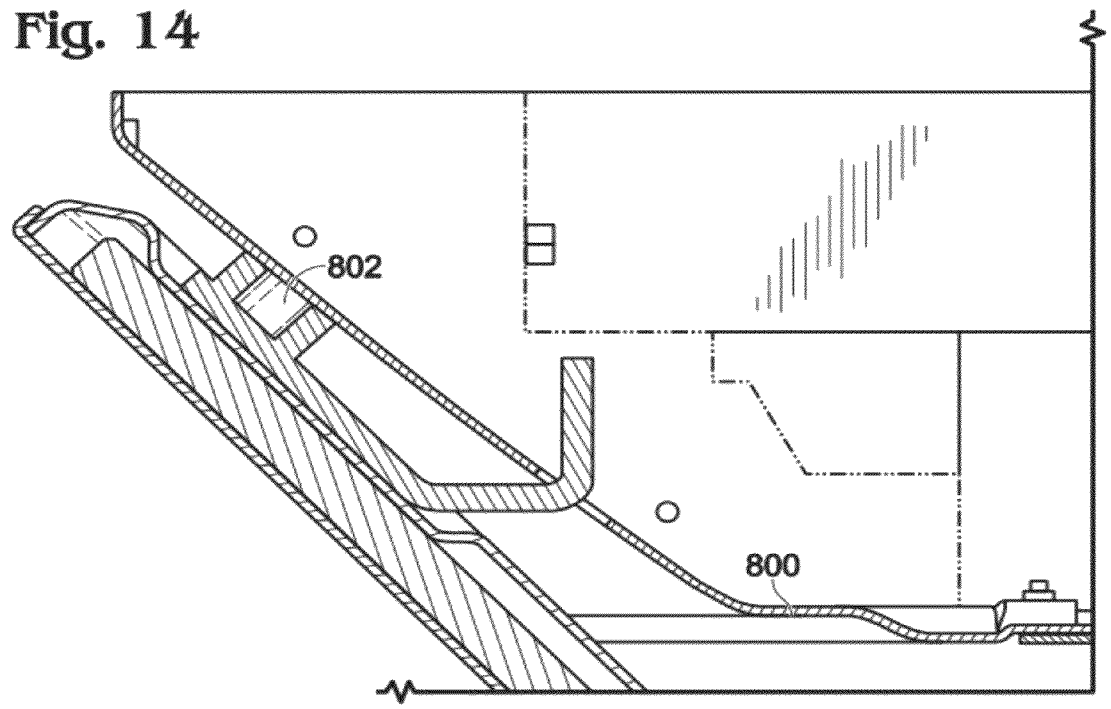
FIGS. 14 and 15 show another example coupling of a stand structure to an interactive display device via a bracket according to an embodiment of the present disclosure.
Figure 15:
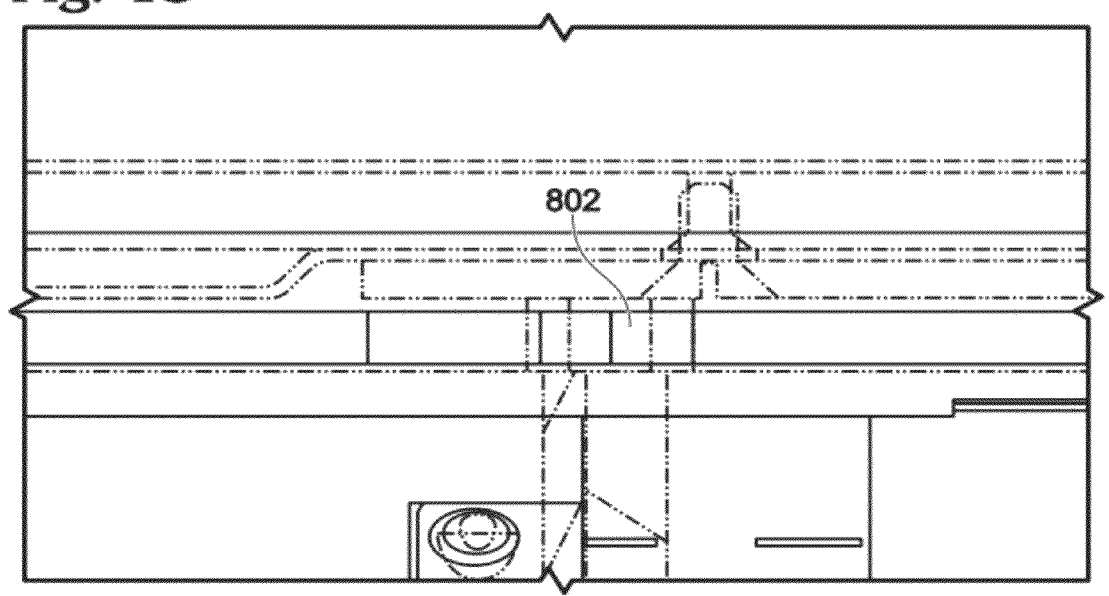
Figure 16:
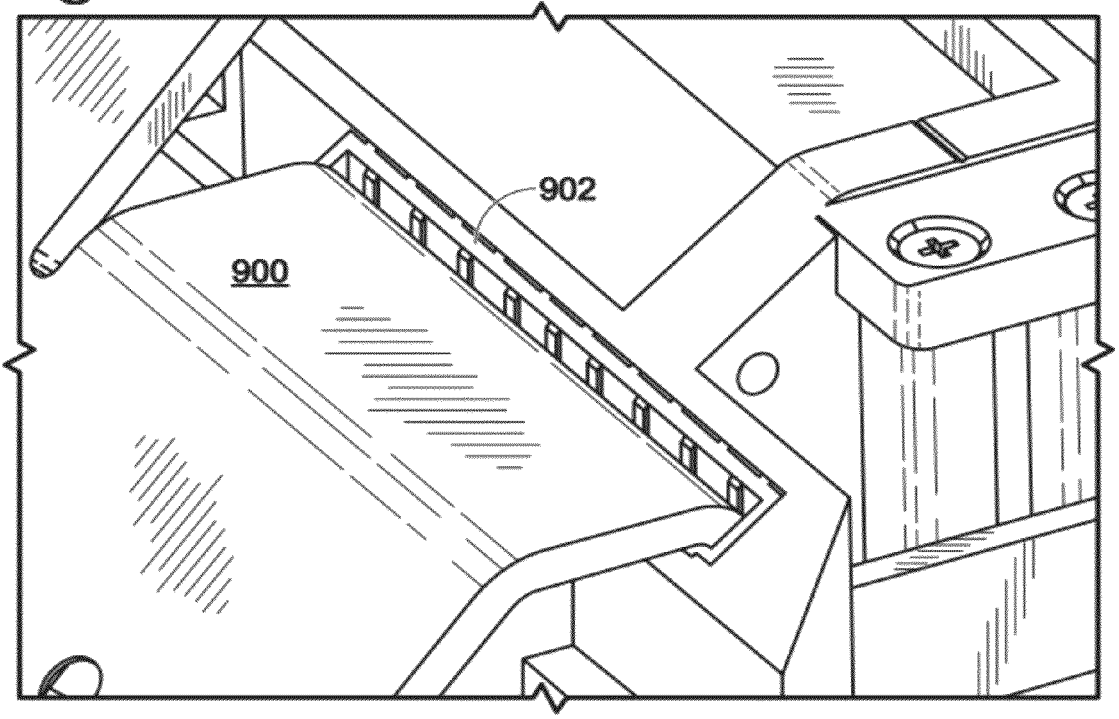
FIG. 16 shows another example coupling of a stand structure to an interactive display device via a bracket according to an embodiment of the present disclosure.
Figure 17:
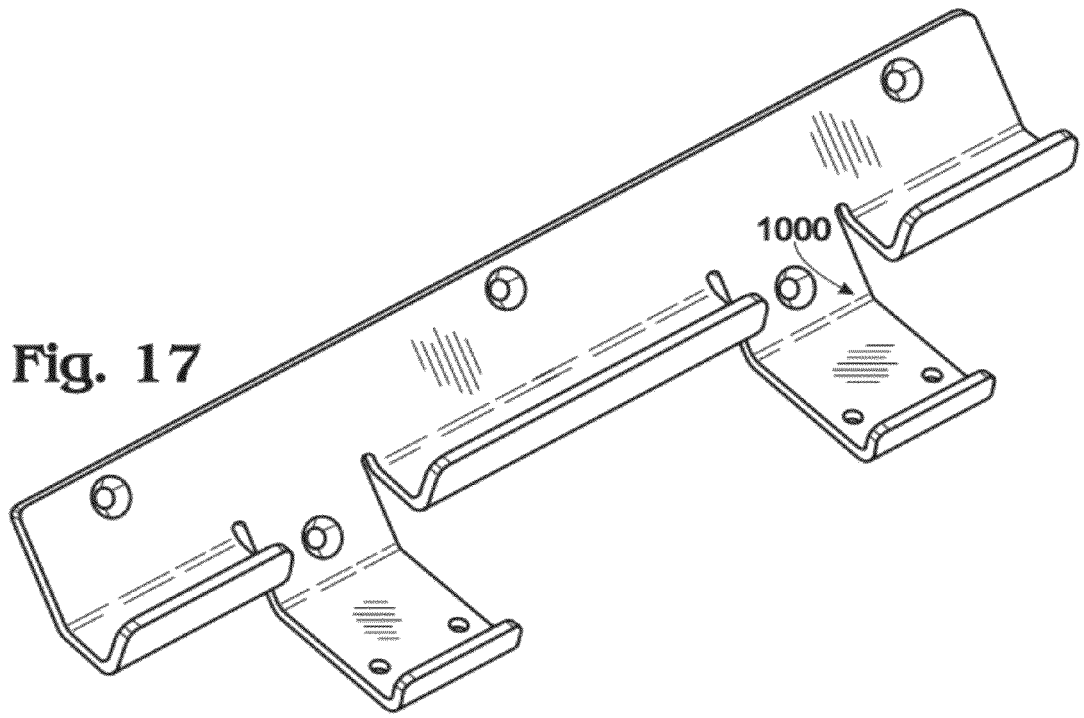
FIG. 17 shows another example coupling of a stand structure to an interactive display device via a bracket according to an embodiment of the present disclosure.

FIGS. 14 and 15 show another embodiment of a bracket 800 that comprises a bushing 802 formed from a material such as urethane or other elastomer to provide additional structural rigidity to reduce leg movement, as the depicted bushing will push against ribs of the internal chassis rather than the main housing. As another example, FIG. 16 shows an embodiment of a bracket 900 attached to a chassis comprising a crush insert 902 positioned within the integrated mounting bracket slot to tighten the slot. As yet another example, FIG. 17 shows a bracket comprising a dart or gusset 1000. It will be understood that these components may be used individually or in any suitable combination. It will further be understood that these structures are presented for the purpose of example, and that any other suitable mechanism or mechanisms may be used to secure a stand structure to a chassis.

It is to be understood that the configurations and/or approaches described herein are exemplary in nature, and that these specific embodiments or examples are not to be considered in a limiting sense, because numerous variations are possible. Further, the subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mounting chassis for an interactive display device, comprising:
   a plurality of sides defining an opening, the plurality of sides including a lip extending into the opening, the lip being configured to support an electronic display panel positioned in the opening;
   one or more display panel fastening features disposed on the plurality of sides; and
   one or more integrated stand mounts disposed on one or more sides of the plurality of sides.

2. The mounting chassis of claim 1, wherein the plurality of sides comprises long and short sides and the one or more integrated stand mounts include slots on the short sides.

3. The mounting chassis of claim 1, wherein at least a portion of the plurality of sides are formed from extruded plastic.

4. The mounting chassis of claim 1, wherein two or more sides of the plurality of sides are formed from a single extruded shape.

5. The mounting chassis of claim 1, wherein at least a portion of the plurality of sides are formed from sheet metal.

6. The mounting chassis of claim 1, wherein at least a portion of the plurality of sides are die cast or molded.

7. The mounting chassis of claim 1, further comprising one or more component mounts integrated into one or more of the sides and being configured to mount accessory components.

8. The mounting chassis of claim 1, wherein the chassis comprises VESA mounting features.

9. The mounting chassis of claim 1, wherein the plurality of sides comprises a top surface having one or more border mounting features.

10. The mounting chassis of claim 9, wherein the one or more top border mounting features include locating features.

11. An interactive display device, comprising:
    an electronic display panel;
    a display top border, the display top border including an aperture sized to expose a viewing surface of the electronic display panel; and a mounting chassis comprising:
- a plurality of sides defining an opening, the plurality of sides comprising a top surface having one or more top border mounting features and a lip extending inwardly and being configured to support the electronic display panel;
- one or more display panel fastening features disposed on the plurality of sides;
- one or more component mounts integrated into one or more of the sides and being configured to mount accessory components; and
- one or more integrated stand mounts integrated into one or more of the sides, the one or more integrated stand mounts each configured to receive insertion of a connecting structure on a stand.

12. The interactive display device of claim 11, further comprising a skin external to the chassis and coupled to the chassis.

13. The interactive display device of claim 11, further comprising an electric plane coupled to the electronic display panel and/or the chassis.

14. The interactive display device of claim 11, further comprising an electrical component that utilizes the chassis as a heat sink.

15. The interactive display device of claim 11, further comprising a stand having one or more legs, wherein the one or more integrated stand mounts include mounting slots into which mounting brackets of the legs extend.

16. The interactive display device of claim 15, further comprising a pin disposed in a selected mounting slot, the pin being configured to extend through a hole in a corresponding mounting bracket.

17. The interactive display device of claim 15, wherein one or more mounting brackets comprises one or more of an elastomeric bushing configured to contact the chassis when a bracket having the elastomeric bushing is inserted in the slot, a dart, a gusset, and a curved end configured to fit in a curved portion of a complementary mounting slot.

18. The interactive display device of claim 11, further comprising one or more accessory components mounted to the component mounts, the one or more accessory components including one or more of a speaker, a radio frequency antenna, and a printed circuit board assembly.

19. An interactive display device, comprising:
a mounting chassis comprising:
- a plurality of sides defining an opening, the plurality of sides comprising a top surface having one or more top border mounting features and a lip extending inwardly into the opening,
- one or more display panel fastening features disposed on the plurality of sides,
- one or more component mounts integrated into one or more of the sides and being configured to mount accessory components,
- one or more border mounting features disposed on the top surface of the plurality of sides; and
- one or more integrated stand mounts integrated into one or more of the sides;

an electronic display panel disposed within the opening of the chassis and supported by the lip, the electronic display panel being coupled to the chassis via the display panel fastening features;

one or more stand components coupled to the one or more integrated stand mounts; and a display top border mounted to the one or more border mounting features, the display top border including an aperture sized to expose a viewing surface of the electronic display panel.

20. The interactive display device of claim 19, further comprising one or more accessory components mounted to the component mounts, the one or more accessory components including one or more of a speaker, a radio frequency antenna, and a printed circuit board assembly.

\* \* \* \* \*